United States Patent
Kanarellis et al.

(10) Patent No.: US 10,218,216 B2
(45) Date of Patent: *Feb. 26, 2019

(54) SYSTEM AND METHOD FOR SUPPLYING UNINTERRUPTIBLE POWER TO A POE DEVICE IN A POWERED STATE

(71) Applicant: BTU RESEARCH LLC, Houston, TX (US)

(72) Inventors: Michael Kanarellis, Houston, TX (US); Charles I. McAndrew, Magnolia, TX (US)

(73) Assignee: BTU RESEARCH LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/676,997

(22) Filed: Aug. 14, 2017

(65) Prior Publication Data

US 2018/0013319 A1  Jan. 11, 2018

Related U.S. Application Data

(63) Continuation-in-part of application No. 15/201,474, filed on Jul. 3, 2016, now Pat. No. 9,735,618.

(51) Int. Cl.

| | |
|---|---|
| *H02J 7/00* | (2006.01) |
| *H02J 9/00* | (2006.01) |
| *H02J 9/06* | (2006.01) |
| *H04L 12/10* | (2006.01) |
| *H04L 12/413* | (2006.01) |

(52) U.S. Cl.

CPC ............. *H02J 9/061* (2013.01); *H02J 7/007* (2013.01); *H02J 7/0024* (2013.01); *H02J 9/00* (2013.01); *H04L 12/10* (2013.01); *H04L 12/413* (2013.01); *Y10T 307/625* (2015.04)

(58) Field of Classification Search

CPC .. H02J 9/00; H02J 9/061; H02J 7/0024; H02J 7/007; H04L 12/10; Y10T 307/625
USPC .......................................................... 307/66
See application file for complete search history.

(56) References Cited

U.S. PATENT DOCUMENTS

| | | | |
|---|---|---|---|
| 6,862,353 | B2 | 3/2005 | Rabenko et al. |
| 7,081,827 | B2 | 7/2006 | Addy |
| 7,286,556 | B1 | 10/2007 | Jackson |
| 7,325,150 | B2 | 1/2008 | Lehr et al. |
| 7,478,251 | B1 | 1/2009 | Diab et al. |
| 7,872,378 | B2 | 1/2011 | Lo |
| 8,386,832 | B2 | 2/2013 | Karam et al. |

(Continued)

*Primary Examiner* — Carlos D Amaya
(74) *Attorney, Agent, or Firm* — Craft Chu PLLC; Andrew W. Chu

(57) ABSTRACT

A system and method for supplying uninterruptible power includes a housing, a power supply input, a power source equipment input, a first powered device output, a second powered device output, an alternative power supply, and a control module. The control module includes a comparator, a switch, a converter and an injector. The injector includes a regulator and power autonegotiation module. The alternative power supply includes a plurality of battery packs in series. There can also be first and second powered devices with uninterrupted power, even when only one of the powered devices breaks. A power is uninterrupted to the first powered device, even if power is stopped to the second powered device, due to a repair or fault of the second powered device.

16 Claims, 3 Drawing Sheets

(56) References Cited

U.S. PATENT DOCUMENTS

| | | |
|---|---|---|
| 8,595,550 B1 | 11/2013 | Heath et al. |
| 9,735,618 B2 * | 8/2017 | Kanarellis ................ H02J 9/00 |
| 2006/0186739 A1 | 8/2006 | Grolnic et al. |
| 2008/0073977 A1 | 3/2008 | Grolnic et al. |
| 2009/0243391 A1 | 10/2009 | Susong et al. |
| 2012/0080944 A1 | 4/2012 | Recker et al. |
| 2014/0139664 A1 | 5/2014 | Herzel et al. |

* cited by examiner

SYSTEM AND METHOD FOR SUPPLYING UNINTERRUPTIBLE POWER TO A POE DEVICE IN A POWERED STATE

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to system and method for supplying uninterruptible power to a Power-over-Ethernet (PoE) device. More particularly, the present invention relates to a system with an active injector connected to a power supply input, an alternative power supply, and a power source equipment input as the PoE power. The present invention relates to a method for controlling an uninterrupted power supply in a powered state.

2. Description of Related Art Including Information Disclosed Under 37 CFR 1.97 and 37 CFR 1.98

A "Power over Ethernet" device is a powered device that works on electrical power supplied by an Ethernet cable. Power over Ethernet ("PoE") describes a technique to deliver electrical power via Ethernet cabling. A single cable transmits data and electrical power to devices, such as IP security cameras, network webcams, wireless access points, VoIP phones, network routers and others. There is no need for a separate power source for the PoE device. IEEE PoE standards set signaling standards for power source equipment, the actual power source, and the powered device, so that the powered devices and power source equipment can communicate. The power source equipment and powered device detect each other and regulate the amount of power supplied to the PoE device. By IEEE PoE standards, there is only a limited power transmission available through an Ethernet cable.

An uninterruptible power supply "("UPS"), or uninterruptible power source, provides emergency power to a powered device when the main power source is disrupted. The UPS is an immediate and generally instantaneous alternative power supply available as soon as the main power source fails. In contrast, a standby or emergency system is a separate power source, which must be activated and then switched over to supply the powered device. The immediacy and lack of delay are important for sensitive electronic equipment and continuous data processing.

The UPS protects powered devices from loss of data, loss of status information related to the powered device, and the subsequent costs associated with repair and resetting of the powered device. Those extra costs avoided can include delays in data processing, sending technicians off site to the location of the powered device, and loss of revenue from downtime of the system. UPS also prevents disruption of the software of a powered device. An unexpected loss of power may necessitate a re-boot or restart of the system, causing more delay and downtime beyond the downtime caused by the disruption of power.

In the prior art, the UPS has been an alternate power switch, activated as soon as a power disruption is detected. A switch changes the regular power supply to an alternative power source, such as a battery. Critical devices, such as heart monitors and breathing machines in a hospital room, may cease to function with an unexpected loss of power. The UPS intervenes during these moments to eliminate all the associated equipment and network downtime.

Various patents and publications are available in the field of uninterruptible power supplies. United States Patent Application No. 2012/0080944, published by Recker, et al. on Apr. 5, 2012, discloses a method and system that, in relevant part, keep a lighting grid functional in the absence of power. An intelligent control device, a wall switch, for instance, and a lighting grid must be wired to communicate with each other and have individual battery backups. When the intelligent control device identifies a power outage, it communicates to those devices with their own backups on the grid to adjust to motion and environment, as well as to change intensity and color.

For PoE devices, the incorporation of a UPS is complicated because of coordination between the power supply and the powered device. The PoE device is typically far removed from the actual power supply, such as an AC power outlet. A disruption in the AC power at the power outlet affects the power source equipment, not the PoE device. The UPS for the power source equipment is the prior art system of a battery or alternate power supply with an instantaneous switch. There is no UPS for a PoE device because the PoE device has no power cord to a power supply, as in the prior art.

United States Patent Application No. 2009/0243391, published by Susong, III, et al. on Oct. 1, 2009, describes a power supply designed to provide power to networking utilities such as routers and switches. The power supply accepts alternating current, converts it to direct current, and powers at least one PoE port. The power source also includes an internal battery backup, and redundancies to make sure the power remains continuous. In order to provide continuous power, the device includes a failover communication interface between the main power supply and a backup source operating in an off-line mode. The failover interface detects when the main power source has been interrupted, at which time the backup source becomes the on-line source to provide power to the device.

U.S. Pat. No. 7,286,546, issued to Jackson on Oct. 23, 2007, discloses a system and method for delivering power to a number of devices attached to a central networking device. The central networking device delivers power over an Ethernet network, and can provide backup power to those devices on the network that would normally not warrant multiple redundant power sources. The system discloses delivery of power over a cable with different wires for data and power, or over the same cable using different frequencies and filters to maintain the integrity of the signals.

The prior art systems for providing UPS for a PoE device fail to address the separation between the power source equipment and PoE devices. For example, remote network webcams connect by Ethernet cables for the power and data transmission to a control center. The control center is located miles away and monitors multiple network webcams in other locations far and near. The prior art systems provide UPS for the control center as the power source equipment for the remote network webcams. The advance prior art systems relate to prioritizing which PoE devices continue to receive power during an outage at the control center as the power source equipment. There is no disclosure of any power supply issue at the location of the PoE device. Local power management is an unnecessary redundancy of the control center management of the prior art.

However, not all remote network webcams can use the control center as power source equipment. Over long distances, the voltage necessary to transfer power and data from the control center to each remote network webcam is too high for Ethernet cables. The capacity of the Ethernet cable is insufficient to power remote PoE devices in many instances. Voltage drops or current fluctuations are created by resistance build-ups over lengthy power runs through Ethernet cables. Traditional PoE injectors overcome the long distance and Ethernet cable capacity issues. The PoE injector connects local AC power to the PoE device, concurrent with the data transmission between the control center and the PoE device. The prior art UPS systems for PoE devices do not address the injector-based systems for extensive and wide networks. Power disruptions at the local level of the injector and PoE device continue to affect systems with widespread PoE devices. A localized power outage can still disrupt PoE devices within an overall network, even as UPS prior art protects the control center. Prior art UPS systems have not yet addressed the expansion of PoE devices in wide and remote networks.

Additionally, PoE devices rely on passive injectors. The amount of power received from the PoE device is the amount of power received as a pass-through the available cables. There is no active management of the amount of power in order to support the powered device. The system is limited to the length of cable between the power source equipment and the powered device because the amount of power passed through controlled the power available to the powered device. The systems with old cables and old power source equipment having previous PoE standards (such as IEEE 802.3af) would never be able to pass through sufficient power for the powered devices that require the updated PoE standards, such as IEEE 802.3at. The account for technology upgrades to the physical constraints of the equipment, there is a need for a system to actively set the threshold for the powered device output.

Further mechanical limitations include the length of cable. The range of the network cannot be extended due to the inherent limitation of 100 m per segment of CAT-5 based Ethernet cables. There is a need to extend the range, while maintaining the 10/100/1000 base-T functionality. The powered device must maintain connections from the control center of the network to the remote location of the system and from the location of the system to the powered device.

In the powered state with AC power from the power supply input, the method for regulating the power available can vary. When the power is abundant, there is need to manage the system so that the alternative power supply is charged and ready. The priority and sequence of available power has not been addressed in previous disclosures. Additionally, the priority and sequence of shutting off power is not addressed for more than one powered device and more than one powered device output.

It is an object of the present invention to provide embodiments of a system and method for supplying uninterruptible power to a PoE device.

It is an object of the present invention to provide embodiments of a system and method for managing power from a power supply input in a powered state.

It is another object of the present invention to provide embodiments of a system and method for regulating available power to the powered devices and the alternative power supply.

It is another object of the present invention to provide embodiments of a system and method for regulating available power to the powered devices and to charge the batteries of the alternative power supply.

It is still another object of the present invention to provide embodiments of a system and method for supplying uninterruptible power for more than one powered device.

These and other objectives and advantages of the present invention will become apparent from a reading of the attached specifications and appended claims.

BRIEF SUMMARY OF THE INVENTION

Embodiments of the present invention include a system for supplying uninterruptible power for a Power over Ethernet (PoE) device. In embodiments of the present invention, the system includes a housing, a power supply input on the housing, a power source equipment input on the housing, a powered device output on the housing, an alternative power supply within the housing, and a control module within the housing. The control module includes a battery charger. When the alternative power supply is a plurality of battery packs, the battery charger supplies power to charge the battery packs in sequence in the powered state. The battery packs can be charged with the availability of the onsite power in addition to any power from the power source equipment.

Embodiments of the present invention also include the system having a housing, a power supply input on the housing, a power source equipment input on the housing, a first powered device output on the housing, a second powered device on the housing, an alternative power supply within the housing, and a control module within the housing. In this embodiment, the system still supplies uninterrupted power to both powered devices, even if a problem occurs with one of the powered devices. The system manages to charge the alternative power supply and stop supplying power to powered device outputs, when there are faults in the corresponding powered devices. The powered devices without any faults are maintained with uninterrupted power.

DETAILED DESCRIPTION OF THE INVENTION

Figure 1:
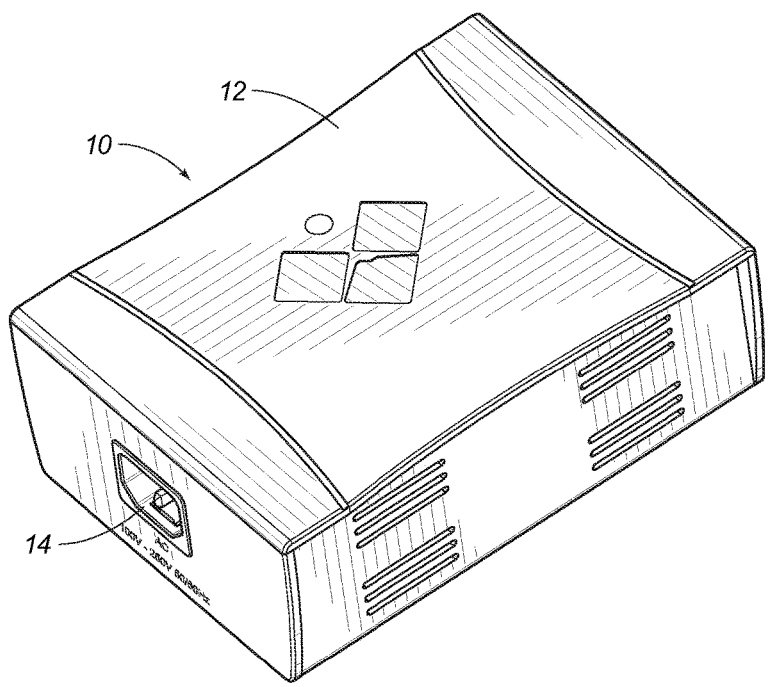
FIG. 1 is an upper perspective view of an embodiment of the system for supplying uninterruptible power, according to the present invention.

Referring to FIGS. 1-6, embodiments of the system 10 for supplying uninterruptible power are shown. The system 10 includes a housing 12, a power supply input 14, a power source equipment input 16, a first powered device output 18, a second powered device output 18', an alternative power supply 20, and a control module 22. FIGS. 1-4 show the housing 12 as a separate unit for placement at a location of the powered device or PoE device. The PoE device is remotely located from a control center of the overall network of PoE devices, and the power source for the control center is separate from each PoE device. The PoE device relies on the data transmission back and forth through the network from the control center. The only power from the control center or from intervening power source equipment is transmitted by Ethernet cabling. Because of the physical restraints of Ethernet cabling, not much power is transmitted to the system 10. The Ethernet cabling engages the power source equipment input 16, supplying primarily data and some power. There may be some power transmitted from the power source equipment through the power source equipment input 16, but that power is not generally sufficient to run the PoE device. As such, the intervening power source equipment can be a router or network switch. The PoE device is required to source power from a more local source, while still transmitting and using data and the bit of power from the power source equipment input 16. Ethernet cabling originating from the control center can connect to the power source equipment input 16, which connects the system 10 into the overall network of data.

FIGS. 1-4 also show the power supply input 14, which actually supplies the power for the system 10 and the powered device output 18 for the PoE device. In some embodiments, a wall outlet near the powered device plugs into the housing 12 at the power supply input 14. Other local power sources can be used, such as batteries. In the present invention, the power source connected to the power supply input 14 must be separate from the power source for the power source equipment and control center. The system 10 operates as a part of an overall system. The collection and transmission of data at remote locations, like at the system 10, are incorporated into the overall network. Power disruptions in one location will not crash the entire network. The system 10 of the present invention adds an uninterruptible power supply (UPS) to PoE devices. Previous networks only have the UPS at the control center to preserve data and avoid disruption. The system 10 of the present invention allows UPS at the remote location of the PoE device.

Figure 2:
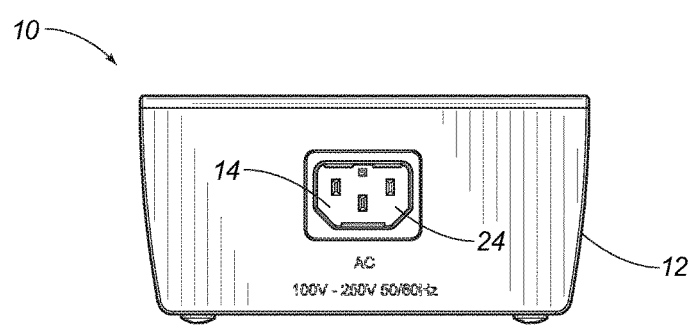
FIG. 2 is an end view of the embodiment of FIG. 1.

On the housing 12, the power supply input 14 is disposed with a Power Supply (PS) interface 24, as shown in FIGS. 1 and 2. The interface 24 is on an outside surface of the housing 12. The interface 24 is compatible as a wall socket connection for a power cord or other extension cord. The cord connects to an AC power source, such as a wall outlet. The AC power source is closer to the powered device than the control center or power source equipment within the network.

Figure 3:
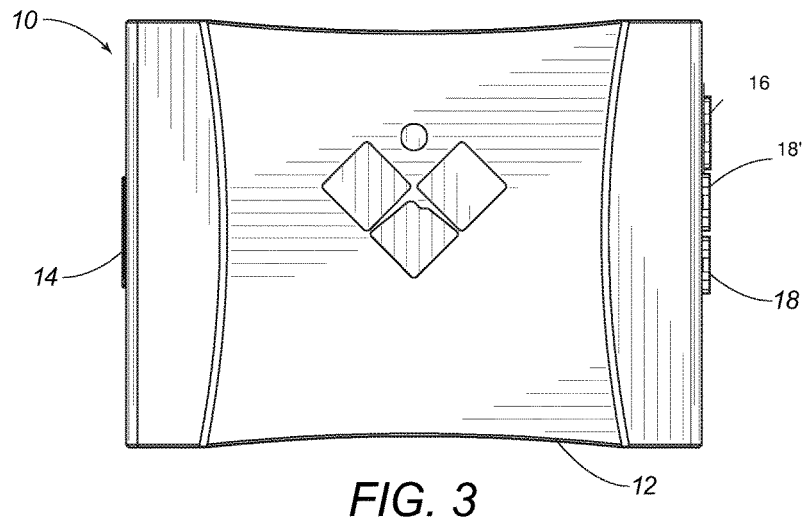
FIG. 3 is a top plan view of the embodiment of FIG. 1.
Figure 4:
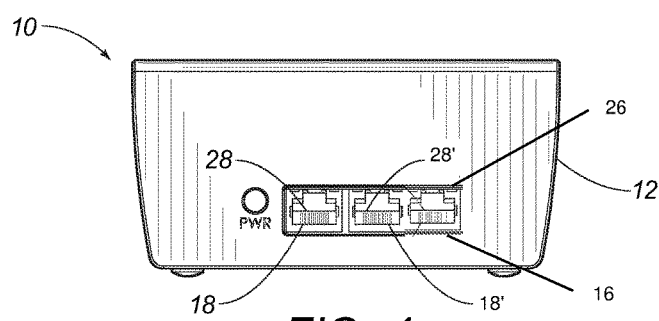
FIG. 4 is an opposite end view of the embodiment of FIG. 1.

FIGS. 3 and 4 show the power source equipment input 16, and the first and second powered device outputs 18, 18' disposed on the housing 12. The power source equipment input 16 has a power source equipment (PSE) interface 26. The first powered device output 18 has a first powered device interface 28, and the second powered device output 18' has a second powered device interface 28'. In embodiments of present invention, the PSE interface 26 and the PD interfaces 28, 28' are Ethernet ports on the outside of the housing 12. Ethernet cables for power and data connect devices to the housing 12 through these interfaces 26, 28 and 28'. Other embodiments include auxiliary power supply cable ports for either of the PSE interface 26 or PD interfaces 28, 28'. In the embodiments of FIGS. 1-5, the power source equipment input 16 connects power source equipment of the overall network. The power source equipment may include a PoE network switch, a non-PoE network switch, a computer network, and other power and data sources. The power source equipment is part of a data and power network. The power source equipment is not powered by the same power source as the system 10.

Also in the present invention, the first powered device output 18 connects a first powered device 46 to the system 10 and the second powered device output 18' connects to a second powered device 46'. The first and second powered devices become part of the overall network as well, with transmission of data and power to other power source equipment, such as a control center computer. In the embodiments of FIGS. 1-5, the first powered device is a PoE device, such as a wireless router, a network webcam, a voice over Internet Protocol (VoIP) telephone, a wireless access point, a camera, and a data processor. FIG. 6 shows a schematic illustration of the first powered device 46 and the second powered device 46'. FIG. 6 also illustrates the power source equipment 44. The power source equipment can be comprised of a network and a network cable with at least one network input and network output so as to provide data and power to the power source equipment input 16. The network cable is an Ethernet cable for power and data transmission back and forth. In some embodiments, the network output has cable supply terminals, such as two 22-28 AWG conductor output supply terminals. The network cable transmits and receives data through the power source equipment input 16 to the control module 22 and to the powered device 46.

Figure 5:
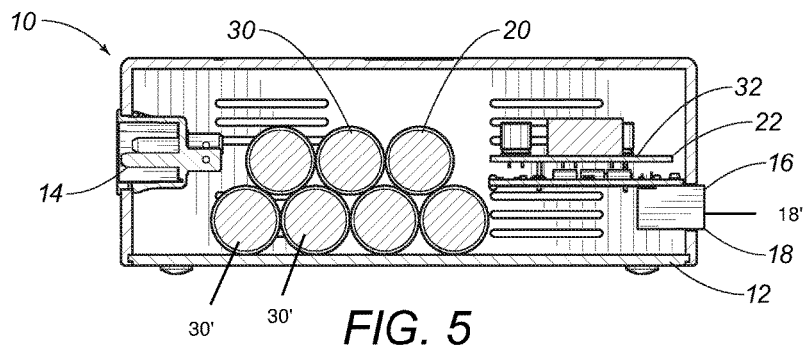
FIG. 5 is a cross-sectional view of an embodiment of the system for supplying uninterruptible power, according to the present invention.
Figure 6:
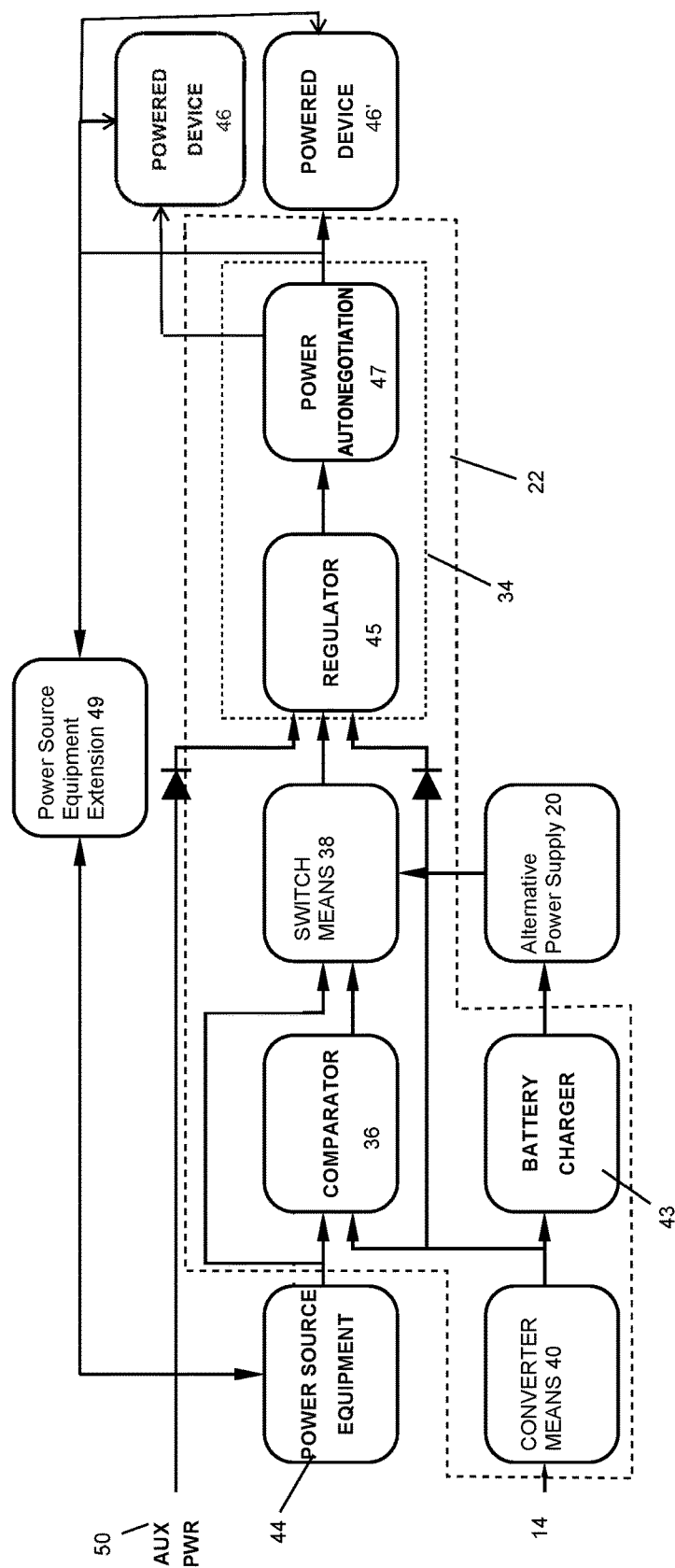
FIG. 6 is a schematic illustration of an embodiment of the system and method for supplying uninterruptible power to a PoE device, according to the present invention.

FIG. 5 shows the embodiments of the alternative power supply 20 disposed within the housing 12. The alternative power supply 20 stores energy for use by the powered device. In some embodiments, the alternative power supply 20 is a battery 30 or plurality of battery packs 30', as illustrated in different ways in FIGS. 5 and 6. The battery packs 30' are connected in series, and each battery pack 30' is charged in order. The control module 22 can detect charge status of each battery pack 30' so that each battery pack 30' can be maintained. In some embodiments, the alternative power supply 20 is a lithium ion battery. In the system 10, the alternative power supply 20 stores power from the power supply input 14 or the power source equipment input 16, so that the alternative power supply 20 is ready to supply power, when there is a disruption of the power supply input 14. Thus, the alternative power supply 20 can also be a chemically activated recharging supply, so that the alternative power supply 20 actively stores power supplied by the system 10. For example, the alternative power supply can store the power from the power source equipment input 16 by Ethernet cable and/or from the power supply input 14 by a power cord.

The control module 22 of the embodiments of the present invention is shown in FIG. 5 as disposed within the housing 12. The control module 22 connects the power supply input 14, the power source equipment input 16, the first powered device output 18, the second powered device output 18', and the alternative power supply 20 into the system 10. The control module 22 manages the power and data received by the system 10 within the housing 12 and distributes data and power to through the powered device outputs 18, 18' to the powered device or PoE device. The regulation of the power within the system 10 insures UPS to the powered devices 46, 46'. There is direct connection of the system 10 between the power source equipment and the powered devices, instead of direction connection of the power source equipment to the powered devices. The buffering like activity of the control module 22 preserves the powered device on the overall network and simultaneously allows for the local connection of the power source to the powered device. UPS for a PoE device is possible with the intervention of the system 10 of the present invention. The particular power regulation by the system 10 is beyond the prior art.

Embodiments of the system 10 in FIG. 6 include the control module 22 being comprised of an injector means 34, a comparator means 36, and a switch means 38 on a printed circuit board (PCB) 32. The PCB 32 is disposed within the housing 12. The injector means 34 collects and distributes data and power to the powered device through the powered device outputs 18, 18'. Data and power are managed by the injector means 34 from the power source equipment input 16, the power supply input 14, and the alternative power supply 20 to the powered device outputs 18, 18'. The comparator means 36 detects power from the power supply input 14 and power to the powered device outputs 18, 18'. The comparator means 36 connects the power source equipment input 16 and the power supply input 14 to the switch means 38. The comparator monitors the amounts of power incoming for the powered device 46, whether the power comes from the power supply input 14 or the power source equipment input 16. For UPS, the power to the powered device outputs 18, 18' must be maintained for operation of the powered devices 46, 46' without regard to the source, so that disrupted sources do not disrupt the powered device. In the present invention, the power supply input 14 connects to a power supply separate from the power supply of the power source equipment. The switch means 38 can be a power switch and selects incoming power from either the power supply input 14 as determined by the comparator means 36 or the alternative power supply 20 or the power source equipment input 16 as determined by the comparator means 36 or any combination thereof to the injector means 34 for distribution. The switch means 38 enables UPS so that power through the powered device outputs 18, 18' is stable for the powered device.

The control module 22 also includes a converter means 40 placed between the injector means 34 and the power supply input 14. When the power source supplies alternating current (AC) to the power supply input 14, the converter means 34 can change the AC to direct current (DC). The DC is compatible with the powered device, and the DC can be distributed from the injector means 34 to the powered device outputs 18, 18'. The control module 22 regulates the power supplied and the power distributed, and the converter means 40 facilitates the conversions between AC and DC. The proper type of power is supplied through the powered device outputs 18, 18' according to the injector means 34.

Embodiments of the present invention include an active injector means 34 being comprised of a regulator 45 and a power autonegotiation module 47 in communication with the regulator 45. The regulator 45 connects the switch means 38 and the converter means 40 to the power autonegotiation module 47, and the power autonegotiation module 47 connects the regulator 45 to the powered device output 18. Previous embodiments have been classified as "passive injectors" with the power source equipment input determining the amount of power. The system 10 was a pass through for the available PoE power to the powered device 46. In the present invention, auto-negotiation is performed so that the current PoE standard (IEEE 802.3at) can be made compatible with the previous PoE standard IEEE 802.3af. Older equipment and existing cabling can now accommodate the updated and more current PoE powered devices at the remote locations. The power autonegotiation module 47 can set a threshold for the powered device regardless of whether the originating PSE complies with the current standard and upgrades. No matter which type of power source equipment is used, the system 10 will appropriately power the powered device 46 to the required IEEE standards. The active injector means 34 connects the power source equipment input 16 to the powered device 46 so as to distribute data between the power source equipment and the powered device. Additionally, the power autonegotiation module 47 determines a predetermined amount of power for the powered device outputs 18, 18' according to the powered devices 46, 46'. The powered device 46 may have different power requirements than the power source equipment connected to the power source equipment input 16. The regulator 45 activates the switch means 38 for the power sources providing the corresponding voltage to the powered device output 18 according to the predetermined amount of power.

According to the monitoring of the comparator means 36, the switch means 38 makes a particular connection between either the power supply input 14, power source equipment input 16, or the alternative power supply 20 according to the regulator 45 commands to the switch means 38. The commands are set by the power autonegotiation module 47 of the injector means 34. Whatever amount of PoE power through the power source equipment input 16, along with the data from the power source equipment, embodiments of the present invention no longer rely on this pass through PoE power for the powered device outputs 18, 18'. The pass through PoE power from the power source equipment input 16 is actively managed by the power autonegotiation module 47 to power the powered devices 46, 46' to contribute power to the powered device or to charge the alternative power supply 20.

The system 10 is usually located so far away from the power source equipment that the Ethernet cables are very long. The distance of the Ethernet cabling diminishes the amount of pass through PoE power able to be harnessed at the power source equipment input 16 by the system 10. Embodiments of the present invention include an auxiliary power supply 50 connected to the regulator 45 of the injector means 34. This auxiliary power supply 50 may be a local outlet, similar to the power supply connected to the power supply input 14 or another PoE power source by another power source equipment. The auxiliary power supply 50 present yet another power source for active management by the power autonegotiation module 47 and regulator 45 of the injector means 34.

FIG. 6 also shows the alternative power supply 20. The alternative power supply 20 can be a rechargeable battery or other chemically activated recharging power source. The embodiment of FIG. 6 shows the control module 22 having a batter recharger 43 connected to the converter means 40 and the alternative power supply 20. The battery charger 43 transfers power from at least one of the power supply input 14 and the power source equipment input 16 and stores power in the alternative power supply 20. As another power source, the alternative power supply 20 is no longer limited to pass through PoE power. The power autonegotiation module 47 may demand more power from the alternative power supply 20 than provided and stored from the power source equipment input 16. In the present invention, the alternative power supply 20 can contribute to the threshold PoE power now required by an upgraded powered device 46, regardless of the pass through PoE power from the power source equipment input 16.

The remaining limitation of the power source equipment has been the physical constraints of the existing Ethernet cables. The network cannot be extended due to the inherent limitation of 100 m per segment for CAT-5 based Ethernet cabling. In the present invention, a power source equipment extension 49 is added between the powered device 46 and the power source equipment connected to the power source equipment input 16. The power source equipment extension 49 can be an Ethernet switch, which adds an additional 100 m to the maximum achievable length of the CAT-5 cable, while maintaining 10/100/1000 base-T functionality. The additional Ethernet switch can pass the PoE managed by the control module 22 to a powered device 46 further from the system 10. The power source equipment extension 49, as another power source equipment, can relay the threshold PoE power further to the powered device 46. Other embodiments include the system 10 being compatible Ethernet cabling with PoE over four CAT-5 pairs instead of two CAT-5 pairs. The capacity increases power up to 60 W to be supplied. Although projected capacity has ranged between 12 VDC-24 VDC, the system 10 can also handle greater than 24 VDC, including up to 60W for modified Ethernet cabling. The fast upgrades to the physical components are good, but existing infrastructure and existing PoE devices cannot be so completely and comprehensively replaced with each upgrade. The injector means 34 of the present invention now accounts for retro-fit networks and future physical upgrades.

Embodiments of the present invention include the method of supplying uninterruptible power to the powered device with the system 10 in the powered state. The powered state refers to the power supply 14 providing the power from an AC supply, such as the system being plugged into a wall outlet. The power autonegotiation module 47 of the injector means 34 sets a predetermined amount of voltage to the first powered device output 18 and the second powered device output 18'. The predetermined amount of voltage corresponds to the powered devices 46, 46'. The powered devices 46, 46' may require more power than available through the power source equipment connected to the power source equipment input 16, especially with more than one powered device. Next, the power supply input 14 supplies power to the powered devices 46, 46' through the regulator 45 of the injector means 34. In this powered state, the power supply input 14 also supplies power to the alternative power supply 20 through the battery charger 43. When the alternative power supply 20 is comprised of a battery 30 or a plurality of battery packs 30', each battery pack 30' is charged in a pre-determined sequence. A main battery pack can always be charged first and maintained first. The control module 22 can detect a charge status of each battery pack 30' so that each battery pack 30' can be maintained in order. The power management controls so that battery packs 30' are charged in the powered state.

When power autonegotiation module 47 detects insufficient power at the injector means 34, the regulator 45 activates to collect power for the powered device output 18 from the power supply input 14 and at least one power source. The charging of the alternative power supply 20 is stopped because the powered device or devices take priority. The regulator 45 commands the switch means to connect to at least one power source that is available, including the alternative power supply 20, the converter means 40, and the power source equipment input 16 through the comparator means 36. After activating the regulator, the injector means 34 monitors voltage at the power supply input 14. When sufficient power from the power supply input is detected, the injector means 34 switches power to the powered device output from the at least one power source to the power supply input 14. The brownout of the power supply input 14 no longer disrupts the powered device 46 or devices 46, 46', even at the remote location and network connection. The instantaneous switch and use of PoE power to manage the powered device enables remote cameras and devices to continue to function through local power outages.

The method includes supplying power to the alternative power supply 20 from the power source equipment input 16, which is recharging the battery with PoE, when that PoE is not being used to power the powered device 46. The battery charger 43 can be used between the converter means 40 and the alternative power supply 20 for recharging the alternative power supply 20.

Embodiments of the present invention include the method of supplying uninterruptible power to the powered device with the system 10 in the powered state with more than one powered device. In this method, the power supply input 14 supplies power to the first and second powered device outputs 18, 18' and charges the alternative power supply 20. When power autonegotiation module 47 detects insufficient power at the injector means 34, the regulator 45 activates to collect power for the first powered device output 18 and the second powered device output 18' from the power supply input 14 and at least one power source. The charging of the alternative power supply 20 is stopped because the powered device or devices take priority. Each battery pack 30' will remain at the current charge status or lower as any power is supplied from the battery packs 30'. The regulator 45 commands the switch means to connect to at least one power source that is available, including the alternative power supply 20, the converter means 40, and the power source equipment input 16 through the comparator means 36. After activating the regulator, the injector means 34 monitors voltage at the power supply input 14. When sufficient power from the power supply input is detected, the injector means 34 switches power to the powered device output from the at least one power source to the power supply input 14. The brownout of the power supply input 14 no longer disrupts the powered device 46 or devices 46, 46', even at the remote location and network connection. The instantaneous switch and use of PoE power to manage the powered device enables remote cameras and devices to continue to function through local power outages.

In the present invention, the method also accounts for interaction between the powered devices 46, 46'. When a fault is detected at either the first or second powered device, the corresponding powered device output 18, 18' is closed. The corresponding powered device output 18, 18' is closed until the fault is resolved, such a replacing the powered device with a repaired powered device or successfully re-starting the powered device with the fault. In some embodiments, the method includes attempting to restart the powered device with the fault before closing the corresponding powered device output. The interaction is independent, and the powered device without the fault is not interrupted. The present invention manages power for the lack of power from the power supply input 14 and from operational problems with multiple powered devices.

The present invention provides a system and method for supplying uninterruptible power to a PoE device. In the powered state with active power from the power supply input, the system recharges the alternative power supply. When the alternative power supply is a plurality of battery packs, each battery pack is charged in sequence. The powered device takes priority, so that only extra power from the power supply input is used to charge the battery packs. The battery packs in series allows a first battery pack to be a main battery pack for the alternative power supply. The battery packs are not left half full or partially full. Instead, the system prioritizes full battery packs for more consistent power, if the power from the power supply input is lost. Additionally, the present invention accounts for problems of the powered devices in systems with more than one powered device. The interaction and isolation of each powered device, relative to the switch and injector of the system improves reliability and consistency.

The foregoing disclosure and description of the invention is illustrative and explanatory thereof. Various changes in the details of the illustrated structures, construction and method can be made without departing from the true spirit of the invention.

We claim:

1. A system for supplying uninterruptible power, comprising:
a housing;
a power supply input disposed within said housing, said power supply input having a power source interface on an outside of said housing;
a power source equipment input disposed within said housing, said power source equipment input having a power source equipment interface on an outside of said housing;
a powered device output disposed within said housing, said powered device output having a powered device interface on an outside of said housing;
an alternative power supply disposed within said housing;
a powered device connected to said powered device output by an Ethernet cable;
power source equipment connected to said power source equipment input, said power source equipment being powered separate from said power supply input and said alternative power supply; and
a control module connected to said power supply input, said power source equipment input, said powered device output, and said alternative power supply,
wherein said control module comprises an injector means, a comparator means, a switch means, and a converter means,
said comparator means detecting power from said power supply input and to said powered device output and connecting said power source equipment input and said power supply input to said switch means,
said converter means providing DC power from AC power from said power supply input and connecting said power supply input to said comparator means, said injector means, and said alternative power supply,
said switch means connecting said comparator means and said alternative power supply to said injector means,
said injector means collecting and distributing power, said injector means being comprised of a regulator and power autonegotiation module, said regulator connecting said switch means and said converter means to said power autonegotiation module, said power autonegotiation module connecting said regulator to said powered device output,
wherein said control module further comprises a battery charger, said battery charger storing power from at least one of said power supply input and said power source equipment input, said battery charger distributing power to said alternative power supply, and
wherein said alternative power supply is comprised of a plurality of battery packs, each battery pack being connected in series.

2. The system for supplying uninterruptible power, according to claim 1, each battery pack of said alternative power supply being comprised of a chemically activated recharging power source.

3. The system for supplying uninterruptible power, according to claim 1, said converter means receiving power from an AC power source and transmitting converted DC power to said battery charger of said control module, said converter means being connected between said power supply input and said injector means so as to provide DC power from an AC source connected to said power supply input.

4. The system for supplying uninterruptible power, according to claim 1, wherein said injector means connects said power source equipment input to said powered device so as to distribute data and power between said power source equipment and said powered device, said power autonegotiation module determining a predetermined amount of power for said powered device output, said regulator activating said switch means, said switch means providing voltage to said powered device output according to said predetermined amount of power.

5. A method of supplying uninterruptible power, said method comprising:
providing a system according to claim 1;
setting a predetermined amount of voltage to said powered device output with said power autonegotiation module;
supplying power from said power supply input to said powered device through said regulator of said injector means;
supplying power from said power supply input to said alternative power supply through said battery charger;
charging said alternative power supply;
detecting insufficient power at said injector means by said power autonegotiation module;
activating said regulator to collect power for said powered device output from said power supply input and at least one power source selected from a group consisting of said alternative power supply, said converter means, and said power source equipment input through said comparator means;
monitoring voltage at said power supply input after the step of activating said regulator;
detecting sufficient power from said power supply input with said regulator; and
switching power to said powered device output from said at least one power source.

6. The method for supply uninterruptible power, according to claim 5, further comprising the step of:
supplying power from said power source equipment input to said alternative power supply through said switch means.

7. The method for supply uninterruptible power, according to claim 5, wherein the step of supplying power from said power source equipment input to said alternative power supply through said switch means further comprises the steps of:
charging each battery pack in a pre-determined sequence;
detecting a charge status of each battery pack; and
maintaining each battery pack, during the step of supplying power from said power supply input to said powered device through said regulator of said injector means.

8. A system for supplying uninterruptible power, comprising:
a housing;
a power supply input disposed within said housing, said power supply input having a power source interface on an outside of said housing;
a power source equipment input disposed within said housing, said power source equipment input having a power source equipment interface on an outside of said housing;
a first powered device output disposed within said housing, said first powered device output having a first powered device interface on an outside of said housing;
a second powered device output disposed within said housing, said second powered device output having a second powered device interface on an outside of said housing;
an alternative power supply disposed within said housing;
a first powered device connected to said first powered device output by an Ethernet cable;
a second powered device connected to said second powered device output by an Ethernet cable;
power source equipment connected to said power source equipment input, said power source equipment being powered separate from said power supply input and said alternative power supply; and
a control module connected to said power supply input, said power source equipment input, said first powered device output, said second powered device output, and said alternative power supply,
wherein said control module comprises an injector means, a comparator means, a switch means, and a converter means,
said comparator means detecting power from said power supply input and to said first powered device output and said second powered device output and connecting said power source equipment input and said power supply input to said switch means,
said converter means providing DC power from AC power from said power supply input and connecting said power supply input to said comparator means, said injector means, and said alternative power supply,
said switch means connecting said comparator means and said alternative power supply to said injector means,
said injector means collecting and distributing power, said injector means being comprised of a regulator and power autonegotiation module, said regulator connecting said switch means and said converter means to said power autonegotiation module, said power autonegotiation module connecting said regulator to said first powered device output and said second powered device output,
wherein said control module further comprises a battery charger, said battery charger storing power from at least one of said power supply input and said power source equipment input, said battery charger distributing power to said alternative power supply, and
wherein said alternative power supply is comprised of a plurality of battery packs, each battery pack being connected in series.

9. The system for supplying uninterruptible power, according to claim 8, said converter means receiving power from an AC power source and transmitting converted DC power to said battery charger of said control module, said converter means being connected between said power supply input and said injector means so as to provide DC power from an AC source connected to said power supply input.

10. The system for supplying uninterruptible power, according to claim 8, wherein said injector means connects said power source equipment input to said first powered device and said second powered device so as to distribute data and power between said power source equipment and said first powered device and said second powered device, said power autonegotiation module determining a predetermined amount of power for said first powered device output and said second powered device, said regulator activating said switch means, said switch means providing voltage to said first powered device output and said second powered device output according to said predetermined amount of power.

11. A method of supplying uninterruptible power, said method comprising:
providing a system according to claim 8;
setting a first predetermined amount of voltage to said first powered device output with said power autonegotiation module;
setting a second predetermined amount of voltage to said second powered device output with said power autonegotiation module;
supplying power from said power supply input to said first powered device and said second powered device through said regulator of said injector means;
supplying power from said power supply input to said alternative power supply through said battery charger;
charging said alternative power supply;
detecting insufficient power at said injector means by said power autonegotiation module;
activating said regulator to collect power for said first powered device output and said second powered device from said power supply input and at least one power source selected from a group consisting of said alternative power supply, said converter means, and said power source equipment input through said comparator means;
monitoring voltage at said power supply input after the step of activating said regulator;
detecting sufficient power from said power supply input with said regulator; and
switching power to said first powered device output and said second powered device from said at least one power source.

12. The method for supply uninterruptible power, according to claim 11, further comprising the step of:
supplying power from said power source equipment input to said alternative power supply through said switch means.

13. The method for supply uninterruptible power, according to claim 11, wherein the step of supplying power from said power source equipment input to said alternative power supply through said switch means further comprises the steps of:
   charging each battery pack in a pre-determined sequence;
   detecting a charge status of each battery pack; and
   maintaining each battery pack, during the step of supplying power from said power supply input to said powered device through said regulator of said injector means.

14. The method for supply uninterruptible power, according to claim 11, further comprising the steps of:
   detecting a fault is at least one of said first powered device and said second powered device; and
   closing a corresponding powered device output, according to said fault, until said fault is resolved.

15. The method for supply uninterruptible power, according to claim 14, further comprising the steps of:
   resolving said fault; and
   restoring said corresponding powered device output, according to said fault.

16. The method for supply uninterruptible power, according to claim 14, further comprising the steps of:
   attempting to restart said corresponding powered device before the step of closing said corresponding powered device output.

* * * * *